United States Patent [19]

Tejima

[11] Patent Number: 4,965,851
[45] Date of Patent: Oct. 23, 1990

[54] RECEIVING ARRANGEMENT WITH A RECEPTION CARRIER FREQUENCY ALTERNATELY CHANGED FROM ONE TO ANOTHER

[75] Inventor: Shunichiro Tejima, Tokyo, Japan

[73] Assignee: NEC Corporation, Japan

[21] Appl. No.: 357,362

[22] Filed: May 26, 1989

[30] Foreign Application Priority Data

May 28, 1988 [JP] Japan ................................ 63-131232

[51] Int. Cl.$^5$ ............................................. H04B 15/00
[52] U.S. Cl. ........................................ 455/52; 455/10;
455/184; 455/186
[58] Field of Search ........................................ 455/8–12,
455/17, 184–186, 229, 231, 237, 275, 336,
51–52, 226; 370/104.1; 340/825.06

[56] References Cited

U.S. PATENT DOCUMENTS 3,676,778  7/1972  Mori ........................................ 455/52
3,896,382  7/1975  Magenheim .......................... 455/12

FOREIGN PATENT DOCUMENTS 0308418  12/1988  Japan ........................................ 455/8

Primary Examiner—Reinhard J. Eisenzopf
Assistant Examiner—Andrew Faile
Attorney, Agent, or Firm—Laff, Whitesel, Conte & Saret

[57] ABSTRACT

In a satellite communication system for carrying out communication between a central station and local stations, each local station includes a receiving apparatus (41) which comprises a converting unit (43) for converting a received radio signal of a received carrier frequency into a converted signal by using a reception carrier signal of a reception carrier frequency and a demodulating unit (44) for demodulating the converted signal into a demodulated signal. Connected to the demodulating unit, a deciding unit (45) decides whether the demodulated signal is normal or abnormal. The deciding unit produces an abnormal signal when the demodulated signal is abnormal. After reception of the abnormal signal, a timer circuit (47) measures a lapsed time to produce a time up signal when the lapsed time is equal to an integral multiple of a predetermined time interval. Responsive to the time up signal, a supplying section (49) alternately supplies first and second carrier signals indicative of first and second memorized frequency signal preliminarily memorized in a memorizing section (48), respectively, one at a time as the reception carrier signal to the converting unit.

2 Claims, 3 Drawing Sheets

RECEIVING ARRANGEMENT WITH A RECEPTION CARRIER FREQUENCY ALTERNATELY CHANGED FROM ONE TO ANOTHER

BACKGROUND OF THE INVENTION

This invention relates to a receiving arrangement for receiving a transmission radio signal through a transmission radio path and, in particular, to a receiving arrangement for use in a satellite communication system.

In a satellite communication system, communication is carried out between a central station and one or more peripheral or local stations via a transmission radio path which comprises a communication satellite in a frequency division fashion. The central station and the local stations are herein called communication stations. Each of the communication stations comprises a transmitting arrangement and a receiving arrangement. The communication satellite comprises usually a plurality of transponders as known in the art. Each of the transponders may be either an active one or a backup one. All of the transponders may be active ones.

In the satellite communication system, each communication station is preliminarily assigned with a transmission carrier frequency for use in the transmitting arrangement and a reception carrier frequency for use in the receiving arrangement. The transmission and the reception carrier frequencies are determined in relation to a specific transponder which is the active one at the time being.

The transmitting arrangement transmits via the specific transponder a transmission radio signal of the transmission carrier frequency assigned thereto. The specific transponder repeats the transmission radio signal to produce a repeated radio signal of a repeated carrier frequency which is shifted downwardly of the transmission carrier frequency by a predetermined frequency difference. The receiving arrangement receives the repeated radio signal by using a reception carrier signal of the reception carrier frequency assigned thereto which is determined by the transmission carrier frequency. More specifically, the receiving arrangement includes a receiving unit for receiving the repeated radio signal to produce a received radio signal of a received carrier frequency determined by the repeated carrier frequency, converting unit for converting the received radio signal in response to the reception carrier signal into a converted signal of an intermediate frequency equal to a difference between the repeated and the reception carrier frequencies, and a demodulating unit for demodulating the converted signal into a demodulated signal.

In the transmitting arrangement, it occasionally occurs that the transmission carrier frequency assigned thereto is changed for some reasons, for example, on failure of the specific transponder. In this event, the reception carrier frequency must be manually changed in the receiving arrangement.

SUMMARY OF THE INVENTION

It is therefore an object of the present invention to provide a receiving arrangement which can automatically change a reception carrier frequency assigned thereto when a transmission carrier frequency is changed in a transmitting arrangement.

Other objects of the present invention will become clear as the description proceeds.

A receiving arrangement to which the present invention is applicable includes receiving means for receiving a transmission radio signal through a transmission radio path to produce a received radio signal of a received carrier frequency, converting means for converting the received radio signal into a converted signal of an intermediate frequency by using a reception carrier signal of a reception carrier frequency, and demodulating means for demodulating the converted signal into a demodulated signal. According to the present invention, the receiving arrangement comprises (1) deciding means connected to the demodulating means for deciding whether the demodulated signal is normal or abnormal, the deciding means producing an abnormal signal when the demodulated signal is abnormal; (2) measuring means connected to the deciding means and given a predetermined time interval for measuring a lapsed time after reception of the abnormal signal, the measuring means producing a time up signal when the lapsed time is equal to an integral multiple of the predetermined time interval; (3) memorizing means for preliminarily memorizing, as first and second memorized frequency signals, first and second frequency signals representative of first and second carrier frequencies, respectively, which are determined by the received carrier frequency and are different from each other; and (4) supplying means connected to the memorizing means, the measuring means, and the converting means for alternately supplying first and second carrier signals indicative of the first and the second memorized frequency signals, respectively, one at a time as the reception carrier signal to the converting means in response to the time up signal.

DESCRIPTION OF THE PREFERRED EMBODIMENT

Figure 1:
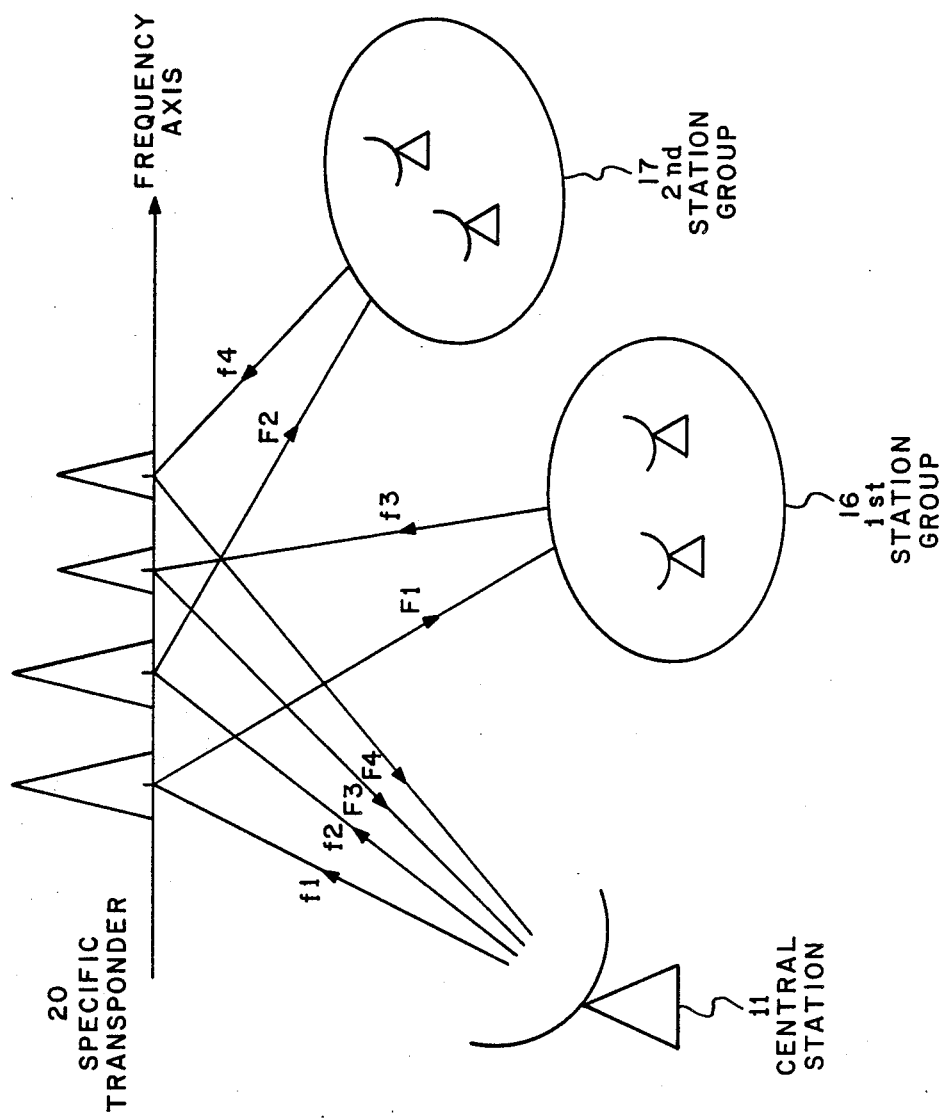
FIG. 1 shows a satellite communication system to which this invention is applicable.

Referring to FIG. 1, description will begin with a satellite communication system to which this invention is applicable. The satellite communication system comprises a central station 11, a first station group 16 of local stations, and a second station group 17 of local stations. The central station 11, the local stations in the first station group 16, and the local stations in the second station group 17 are connected to one another via a specific transponder 20 which is an active one of transponders included in a communication satellite (not shown) in a star-shaped network fashion. The central station 11 and the local stations in the first and the second station groups 16 and 17 are called herein communication stations. Each of the communication stations comprises a transmitting arrangement and a receiving arrangement which will later be described with reference to FIGS. 2 and 3.

On carrying out communication between the central station 11 and the local stations in the first station group 16, the transmitting arrangement of the central station 11 transmits a first transmission radio signal of a first transmission carrier frequency f1. The specific transponder 20 repeats the first transmission radio signal to produce a first repeated radio signal of a first repeated carrier frequency F1 which is shifted downwardly of the first transmission carrier frequency f1 by a predetermined frequency difference. Each receiving arrangement of the local stations in the first station group 16 receives the first repeated radio signal by using a first reception carrier signal of a first reception carrier frequency which is determined by the first transmission carrier frequency f1.

On carrying out communication between the central station 11 and the local stations in the second station group 17, the transmitting arrangement of the central station 11 transmits a second transmission radio signal of a second transmission carrier frequency f2 higher than the first transmission carrier frequency f1. The specific transponder 20 similarly repeats the second transmission radio signal to produce a second repeated radio signal of a second repeated carrier frequency F2 which is shifted downwardly of the second transmission carrier frequency f2 by the predetermined frequency difference. Each receiving arrangement of the local stations in the second station group 17 receives the second repeated radio signal by using a second reception carrier signal of a second reception carrier frequency which is determined by the second transmission carrier frequency f2.

On the other hand, each transmitting arrangement of the local stations in the first station group 16 transmits a third transmission radio signal of a third transmission carrier frequency f3 higher than the second transmission carrier frequency f2. The specific transponder 20 repeats the third transmission radio signal to produce a third repeated radio signal of a third repeated carrier frequency F3 which is shifted downwardly of the third transmission carrier frequency f3 by the predetermined frequency difference. Likewise, each transmitting arrangement of the local stations in the second station group 17 transmits a fourth transmission radio signal of a fourth transmission carrier frequency f4 higher than the third transmission carrier frequency f3. The specific transponder 20 repeats the fourth transmission radio signal to produce a fourth repeated radio signal of a fourth repeated carrier frequency F4 which is shifted downwardly of the fourth transmission carrier frequency f4 by the predetermined frequency difference. The receiving arrangement of the central station 11 receives the third and the fourth repeated radio signals.

As mentioned before, the first transmission carrier frequency f1 and the first repeated carrier frequency F1 are collectively assigned as a first outbound carrier frequency between the central station 11 and the local stations in the first station group 16. The third transmission carrier frequency f3 and the third repeated carrier frequency F3 are collectively assigned as a first inbound carrier frequency between the central station 11 and the local stations in the first station group 16. Similarly, the second transmission carrier frequency f2 and the second repeated carrier frequency F2 are collectively assigned as a second outbound carrier frequency between the central station 11 and the local stations in the second station group 17. The fourth transmission carrier frequency f4 and the fourth repeated carrier frequency F4 are collectively assigned as a second inbound carrier frequency between the central station 11 and the local stations in the second station group 17. In the specific transponder 20, these carrier frequencies are aligned on a frequency axis in order of the first outbound carrier frequency F1/f1, the second outbound carrier frequency F2/f2, the first inbound carrier frequency F3/f3, and the second inbound carrier frequency F4/f4 in a frequency division fashion as shown in FIG. 1.

That is, each of the communication stations is preliminarily assigned with a transmission carrier frequency and a reception carrier frequency which are determined in relation to the specific transponder prior to starting of the communication. Therefore, the communication stations carry out communication each other by using transmission and reception carrier frequencies assigned thereto via the specific transponder.

In the communication satellite system, all of the transponders may be active ones. In this event, another active transponder for use in another satellite communication system is substituted for the specific transponder when the specific transponder fails. That is, communication must be restarted by changing the transmission and the reception carrier frequencies into another transmission and another reception carrier frequencies in each communication station.

Under the circumstances, change of the transmission and the reception carrier frequencies must be manually carried out in a conventional communication station. As a result, it is necessary to consume a lot of time and to put a great deal of work in order to restart the communication. The communication is interrupted until the communication is restarted.

The satellite communication system may be a very small type earth station system comprising a central station and first through N-th station groups each of which comprises a plurality of local stations where N represents a predetermined number equal to, for example, one hundred. The first through the N-th station groups are connected to the central station via a specific transponder in a star-shaped network fashion. In the very small aperture terminal (VSAT) system, each of the first through the N-th station groups comprises tens or hundreds of local stations. Inasmuch as the central station carries out communication with the tens or the hundreds of local stations in each station group by using a transmission and a reception carrier frequency, communication is carried out between the central station and thousands of or tens of thousands of local stations via the specific transponder in the very small aperture terminal system.

In such a very small aperture terminal system, transmission and reception carrier frequencies must be manually changed in the thousands of or the tens of thousands of local stations when the specific transponder fails. Such a change of the transmission and the reception carrier frequencies occurs not only on failure of the specific transponder but also for convenience of use.

Attention is directed according to this invention to the fact that such a change of the transmission and the reception carrier frequencies. In consideration of the fact, this invention provides a receiving arrangement included in a communication station, in particular, in a local station that is automatically capable of changing the reception carrier frequency assigned thereto when the transmission carrier frequency is changed in a central station.

Figure 2:
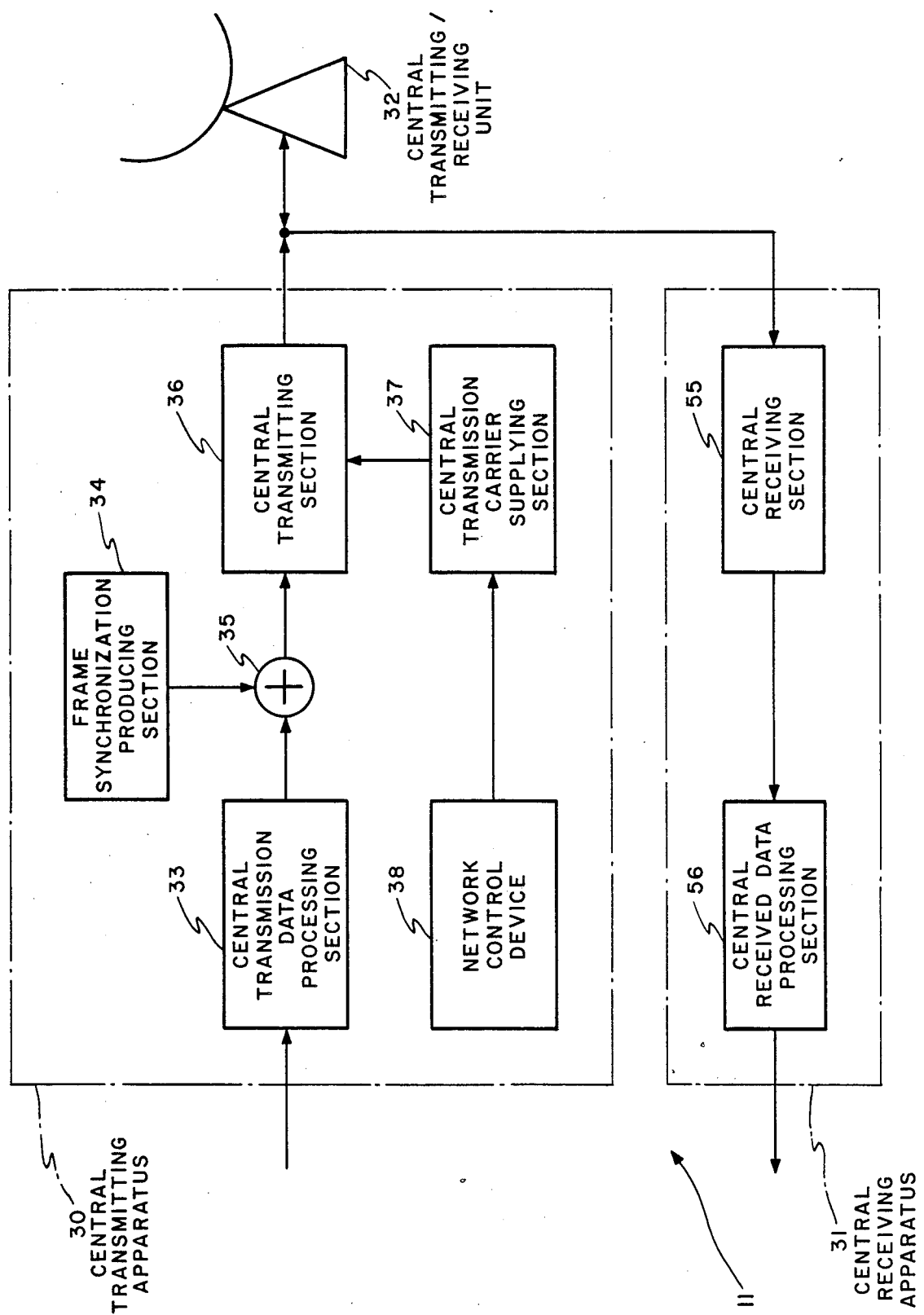
FIG. 2 is a block diagram of a central station for use in the satellite communication system illustrated in FIG. 1.

Referring to FIG. 2, the central station 11 comprises a central transmitting apparatus 30, a central receiving apparatus 31, and a central transmitting/receiving unit 32. The central transmitting apparatus 30 serves as a central transmitting arrangement in combination with the central transmitting/receiving unit 32. The central receiving apparatus 31 acts as a central receiving arrangement in cooperation with the central transmitting-/receiving unit 32. At first, the central transmitting apparatus 30 will be described. The central receiving apparatus 31 will later be described.

The central transmitting apparatus 30 comprises a central transmission data processing section 33 for processing a central transmission data signal into a processed central data signal and a frame synchronization producing section 34 for producing a frame synchronization signal. The processed data signal and the frame synchronization signal are supplied to a multiplexing section 35. The multiplexing section 35 is for multiplexing the processed central data signal and the frame synchronization signal into a multiplexed signal. The multiplexed signal is delivered to a central transmitting section 36.

The central transmitting section 36 converts the multiplexed signal into a central transmission radio signal of a central transmission carrier frequency by using a central transmission carrier signal of the central transmission carrier frequency. The central transmitting section 36 transmits the central transmission radio signal as an outbound transmission radio signal to a communication satellite (not shown) through the central transmitting-/receiving unit 32. The central transmission carrier signal is supplied from a central transmission carrier supplying section 37. The central transmission carrier supplying section 37 supplies the central transmission carrier signal to the central transmitting section 36 in response to a carrier instruction signal which is supplied from a network control device 38.

In the communication satellite, the specific transponder 20 (FIG. 1) repeats the outbound transmission radio signal to produce an outbound repeated radio signal of an outbound repeated carrier frequency which is shifted downwardly of the outbound transmission carrier frequency by a predetermined frequency difference. The outbound repeated radio signal is delivered to the local stations.

Figure 3:
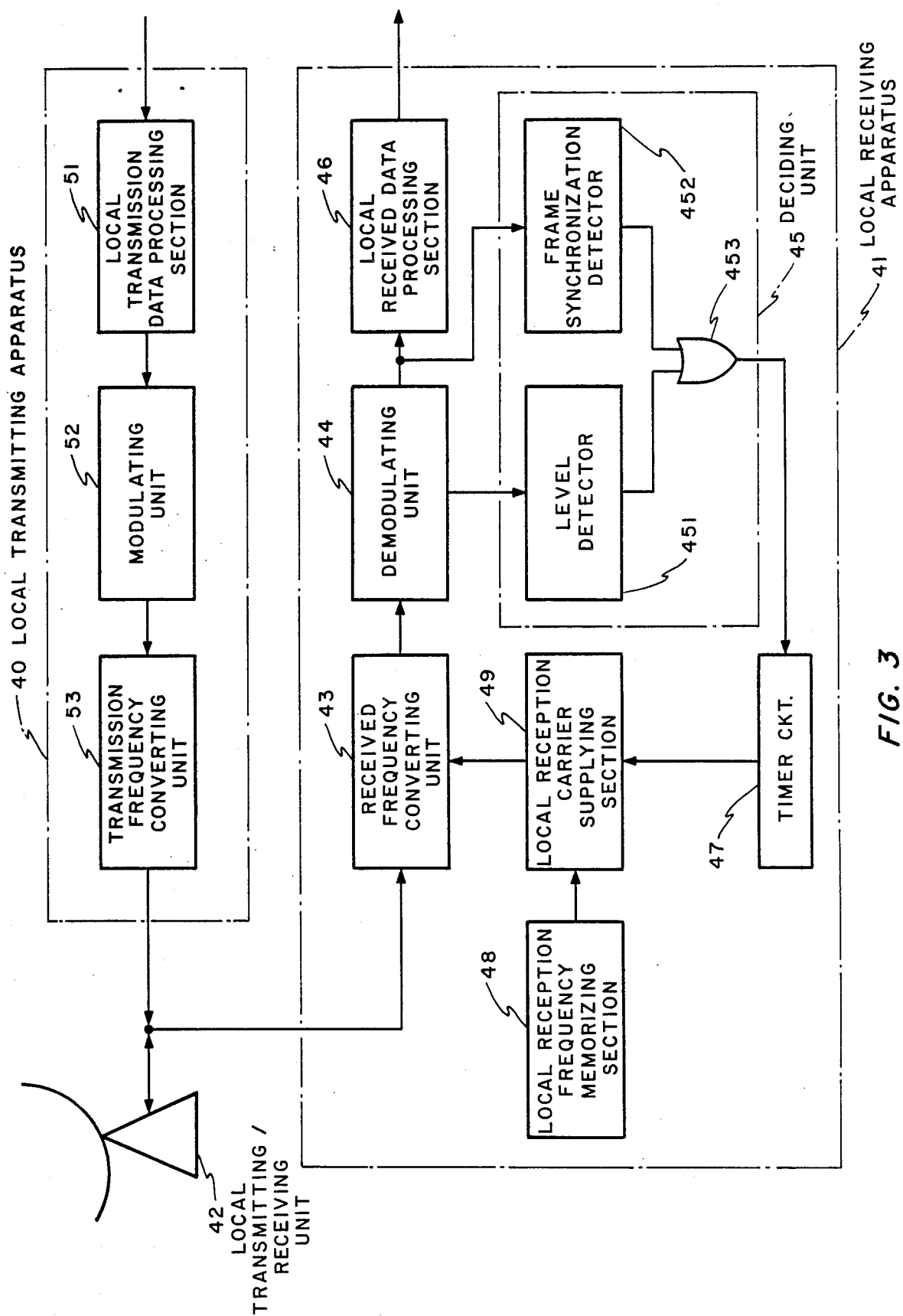
FIG. 3 is a block diagram of a local station for use in the satellite communication system illustrated in FIG. 1.

Turning to FIG. 3, each local station comprises a local transmitting apparatus 40, a local receiving apparatus 41, and a local transmitting/receiving unit 42. The local transmitting apparatus 40 serves as a local transmitting arrangement in combination with the local transmitting/receiving unit 42. The local receiving apparatus 41 acts as a local receiving arrangement in cooperation with the local transmitting/receiving unit 42. At first, the local receiving apparatus 41 will be described. The local transmitting apparatus 40 will be described later in the following.

The local transmitting/receiving unit 42 receives the outbound repeated radio signal to produce an outbound received radio signal of an outbound received carrier frequency determined by the outbound repeated carrier frequency. The outbound received radio signal is delivered to the local receiving apparatus 41.

The local receiving apparatus 41 comprises a received frequency converting unit 43 for converting the outbound received radio signal in response to a local reception carrier signal of a local reception carrier frequency into a converted signal of an intermediate frequency equal to a difference between the outbound received carrier frequency and the reception carrier frequency. The converted signal is delivered to a demodulating unit 44. The demodulating unit 44 demodulates the converted signal into a demodulated signal.

The demodulating unit 44 is connected to a deciding unit 45 and to a local received data processing section 46. The deciding unit 45 decides whether the demodulated signal is normal or abnormal. The deciding unit 45 produces an abnormal signal when the demodulated signal is abnormal. The deciding unit 45 produces a normal signal when the demodulated signal is normal.

The deciding unit 45 comprises a level detector 451 for detecting a level of the converted signal. The level detector 451 produces a communication path failure alarm signal when the level of the converted signal is not greater than a predetermined level. Supplied with the demodulated signal, a frame synchronization detector 452 detects the frame synchronization signal from the demodulated signal. The frame synchronization detector 452 produces a frame synchronization alarm signal when the frame synchronization signal is not detected. The communication path failure alarm signal and the frame synchronization alarm signal are supplied to an OR circuit 453. The OR circuit 453 carries out an OR operation on the communication path failure alarm signal and the frame synchronization alarm signal. The OR circuit 453 produces the abnormal signal when at least one of the communication path failure alarm signal and the frame synchronization alarm signal is present. Otherwise, the OR circuit 453 produces the normal signal.

The local received data processing section 46 processes the demodulated signal into a local received data signal. More specifically, the local received data processing unit 46 extracts, as an extracted data signal, a data signal addressed to the local station in question from the demodulated signal to produce the extracted data signal as the local received data signal.

The deciding unit 45 is connected to a timer circuit 47 which is activated by the abnormal signal and is given by a predetermined time interval. The timer circuit 47 is for measuring a lapsed time after reception of the abnormal signal. The timer circuit 47 produces a time up signal when the lapsed time is equal to an integral multiple of the predetermined time interval. The integral multiple may be equal to one. More specifically, the timer circuit 47 produces a first time up signal when the lapsed time is equal to the predetermined time interval. The timer circuit 47 produces a second time up signal when the lapsed time is equal to twice the predetermined time interval. In general, the timer circuit 47 produces an M-th time up signal when the lapsed time is equal to M times the predetermined time interval where M represents a positive integer. The timer circuit 47 is kept quiescent in response to the normal signal. That is, the timer circuit 47 serves as a measuring section for measuring the lapsed time after reception of the abnormal signal.

The local receiving apparatus 41 further comprises a local reception frequency memorizing section 48 for preliminarily memorizing, as first and second local memorized frequency signals, first and second local frequency signals representative of first and second local carrier frequencies, respectively. The first and the second local carrier frequencies are determined by the outbound received carrier frequency and different from each other. In the first and the second local carrier frequencies, one is used as an active one while another is used as a backup one. A nonvolatile memory is employed as the local reception frequency memorizing section 48 so that nothing memorized in the local reception frequency memorizing section 48 is accidentally erased if no power is supplied to the local station in question.

The local reception frequency memorizing section 48 is connected to a local reception carrier supplying section 49 supplied with the time up signal. The local reception carrier supplying section 49 is for alternately supplying first and second local carrier signals indicative of the first and the second local memorized frequency signals, respectively, one at a time as the local reception carrier signal to the received frequency converting unit 43 in response to the time up signal.

The local transmission apparatus 40 comprises a local transmission data processing section 51 for processing a local transmission data signal into a processed local data signal. Supplied with the processed local data signal, a modulating unit 52 modulates the processed local data signal into a modulated signal. Supplied with the modulated signal, a transmission frequency converting unit 53 converts the modulated signal into a local transmission radio signal of a local transmission carrier frequency. The local transmission radio signal is transmitted as an inbound transmission radio signal to the communication satellite through the local transmitting/receiving unit 42.

In the communication satellite, the specific transponder 20 repeats the inbound transmission radio signal to produce an inbound repeated radio signal of an inbound repeated carrier frequency which is shifted downwardly of the inbound transmission carrier frequency by the predetermined frequency difference. The inbound repeated radio signal is delivered to the central station 11.

Referring again to FIG. 2, the inbound repeated radio signal is received by the central transmitting/receiving unit 32 as an inbound received radio signal of an inbound received carrier frequency which corresponds to the inbound repeated carrier frequency. The inbound received radio signal is delivered to the central receiving apparatus 31.

The central receiving apparatus 31 comprises a central receiving section 55 for receiving and converting the inbound received radio signal into a central converted signal of a baseband frequency. The central converted signal is supplied to a central received data processing section 56. The central received data processing section 56 processes the central converted signal into a central received data signal.

Description will proceed to operation of the local receiving arrangement in the local station illustrated in FIG. 3. It will be assumed that the first local carrier frequency is used as the active local carrier frequency and the second local carrier frequency is used as the backup local carrier frequency. In this event, the local reception carrier supplying section 49 supplies the first local carrier signal indicative of the first local memorized frequency as the local reception carrier signal to the received frequency converting unit 43. In the central station 11 (FIG. 2), the central transmission carrier supplying section 37 of the central transmitting apparatus 30 supplies the central transmission carrier signal of the central transmission carrier frequency corresponding to the first local carrier frequency to the central transmitting section 36 under the control of the network control device 38.

The deciding unit 45 produces the abnormal signal if a transmission path failure occurs due to the transmission path interception by the failure of the specific transponder 20, rainfall, or the like. Responsive to the abnormal signal, the timer circuit 47 is activated to measure the lapsed time after reception of the abnormal signal. When the lapsed time is equal to the predetermined time interval, the timer circuit 47 produces the first time up signal. Supplied with the first time up signal, the local reception carrier supplying section 49 changes the active local carrier frequency from the first local carrier frequency to the second local carrier frequency. Accordingly, the local reception carrier supplying section 49 supplies the second local carrier signal indicative of the second local memorized frequency as the local reception carrier signal to the received frequency converting unit 43.

Similarly, the timer circuit 47 produces the second time up signal when the lapsed time is equal to twice the predetermined time interval. Supplied with the second time up signal, the local reception carrier supplying section 49 changes the active local carrier frequency from the second local carrier frequency to the first local carrier frequency. Accordingly, the local reception carrier supplying section 49 supplies the first local carrier signal indicative of the first local memorized frequency as the local reception carrier signal to the received frequency converting unit 43.

In the manner described before, the local reception carrier frequency is alternately changed between the first local carrier frequency and the second local carrier frequency at a period equal to the predetermined time interval until the timer circuit 47 is kept quiescent in response to the normal signal supplied from the deciding unit 45 when the transmission path returns to normalcy.

It will be assumed that the failure of the specific transponder causes the transmission path failure. The network control device 38 (FIG. 2) thereupon supplies the carrier instruction signal to the central transmission carrier supplying section 37 to make the central transmission carrier supplying section 37 supply the central transmitting section 36 with the central transmission carrier signal of the central transmission carrier frequency corresponding to the second local carrier frequency. On the other hand, the demodulated signal becomes the normal in the demodulating unit 44 when the second local carrier frequency is selected as the active local carrier frequency in the local reception carrier supplying section 49 during the above-mentioned change operation. Accordingly, the transmission path automatically returns to normalcy and then the communication is restarted between the central station 11 and the local station in question with another transponder substituted for the specific transponder 20 and with the second local carrier frequency used as the active local carrier frequency in the local receiving arrangement of the local station in question. It is therefore possible to reduce a period of communication suspension for a frequency change and to provide the satellite communication system which can automatically recover.

It will be assumed that the transmission path failure occurs due to the transmission path interception by the rainfall or the like. In this event, the central transmission carrier frequency is not changed in the central station 11. Accordingly, the change operation of the local reception carrier frequency is carried out in the local station in question during a period of the transmission path interception, but the communication is automatically restarted between the central station 11 and the local station in question via the specific transponder 20 with the first local carrier frequency used as the active local carrier frequency in the local receiving arrangement of the local station in question when the transmission path returns to normalcy.

In this embodiment, the timer circuit 47 has only one predetermined time interval. Alternatively, the timer circuit 47 may have a first predetermined time interval and a second predetermined time interval shorter than the first predetermined time interval. In this event, the timer circuit 47 produces the first time up signal when the lapsed time is equal to the first predetermined time interval and the timer circuit 47 produces an L-th time up signal when the lapsed time is equal to $(L-1)$ times the second predetermined time interval plus the first predetermined time interval where L represents a positive integer greater than one. With this structure, it is possible to shorten a time interval which it takes to recover the satellite communication system on the transmission path failure except for the failure of the specific transponder.

In the manner described before, the change of the central transmission carrier frequency and the local reception carrier frequency occurs for another reasons, for example, for the convenience of use or the like. In this case, for such a change is provided, as the backup local reception carrier frequency for use in the local station, a local reception carrier frequency to be changed. The local reception carrier frequency to be changed corresponds to a backup central transmission carrier frequency to which an active central transmission carrier frequency should be changed in the central station. Under the circumstances, it is possible to automatically restart communication between the central station and the local station after the active central transmission carrier frequency is changed to the backup central transmission carrier frequency in the central station.

What is claimed is:

1. A receiving arrangement which includes receiving means for receiving a transmission radio signal through a transmission radio path to produce a received radio signal of a received carrier frequency, converting means for converting said received radio signal into a converted signal of an intermediate frequency by using a reception carrier signal of a reception carrier frequency, and demodulating means for demodulating said converted signal into a demodulated signal, wherein the improvement comprises:

deciding means connected to said demodulating means for deciding whether said demodulated signal is normal or abnormal, said deciding means producing an abnormal signal when said demodulated signal is abnormal;

measuring means connected to said deciding means and given a predetermined time interval for measuring a lapsed time after reception of said abnormal signal, said measuring means producing a time up signal when said lapsed time is equal to an integral multiple of said predetermined time interval;

memorizing means for preliminarily memorizing, as first and second memorized frequency signals, first and second frequency signals representative of first and second carrier frequencies, respectively, which are determined by said received carrier frequency and are different from each other; and supplying means connected to said memorizing means, said measuring means, and said converting means for alternately supplying first and second carrier signals indicative of said first and said second memorized frequency signals, respectively, one at a time as said reception carrier signal to said converting means in response to said time up signal.

2. A receiving arrangement as claimed in claim 1, wherein said deciding means produces a normal signal when said demodulated signal is normal, said measuring means being kept quiescent in response to said normal signal.

* * * * *